(12) United States Patent
Naito

(10) Patent No.: US 12,184,997 B2
(45) Date of Patent: *Dec. 31, 2024

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Shoko Naito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/457,968

(22) Filed: Aug. 29, 2023

(65) Prior Publication Data

US 2023/0412937 A1 Dec. 21, 2023

Related U.S. Application Data

(63) Continuation of application No. 17/835,826, filed on Jun. 8, 2022, now Pat. No. 11,778,341.

(30) Foreign Application Priority Data

Jun. 10, 2021 (JP) .................................. 2021-097309

(51) Int. Cl.
*H04N 25/50* (2023.01)
*H04N 23/61* (2023.01)
*H04N 23/661* (2023.01)
*H04N 23/69* (2023.01)
*H04N 23/695* (2023.01)
*H04N 25/443* (2023.01)
*H04N 25/77* (2023.01)

(52) U.S. Cl.
CPC ........... *H04N 25/50* (2023.01); *H04N 25/443* (2023.01); *H04N 25/77* (2023.01)

(58) Field of Classification Search
CPC ...... H04N 25/50; H04N 25/443; H04N 25/77; H04N 23/61; H04N 23/661; H04N 23/69; H04N 23/695; H04N 23/71; H04N 25/51
See application file for complete search history.

(56) References Cited

U.S. PATENT DOCUMENTS

| | | | | |
|---|---|---|---|---|
| 11,245,861 B2* | 2/2022 | Niwa | ...................... | H04N 25/77 |
| 11,778,341 B2* | 10/2023 | Naito | ...................... | H04N 25/50 |
| 2018/0167575 A1* | 6/2018 | Watanabe | ............ | H04N 25/771 |
| 2018/0295270 A1* | 10/2018 | Oshima | .............. | H04N 23/6811 |
| 2022/0038645 A1* | 2/2022 | Takahashi | .............. | H04N 25/77 |
| 2022/0141402 A1* | 5/2022 | Oshima | ................. | H04N 25/50 |
| 2022/0150424 A1* | 5/2022 | Numara | ................. | H04N 25/77 |

FOREIGN PATENT DOCUMENTS

JP      2020072317 A    5/2020

* cited by examiner

*Primary Examiner* — Marly S Camargo
(74) *Attorney, Agent, or Firm* — Canon U.S.A., Inc. IP Division

(57) ABSTRACT

An apparatus includes a motion detection unit configured to detect a moving object in an angle of view based on an event signal indicating a location of a pixel where a luminance change occurs and time when the luminance change occurs, a shape detection unit configured to detect a shape of the moving object from frame data generated based on the event signal, and a control unit configured to change the angle of view, wherein in a case where the detected moving object is not currently detected, the shape detection unit detects the shape of the moving object by changing the angle of view by a predetermined value.

20 Claims, 6 Drawing Sheets

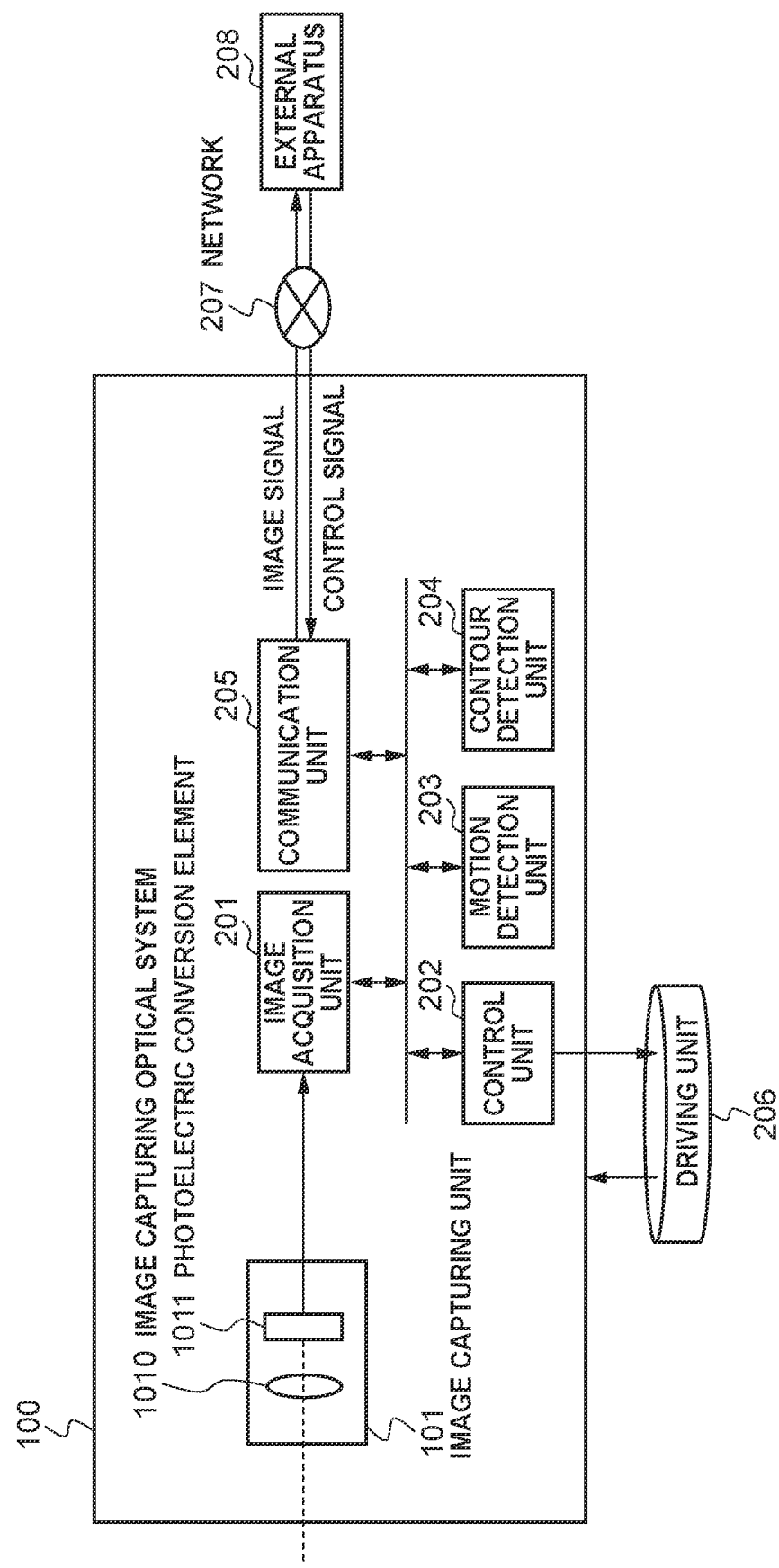

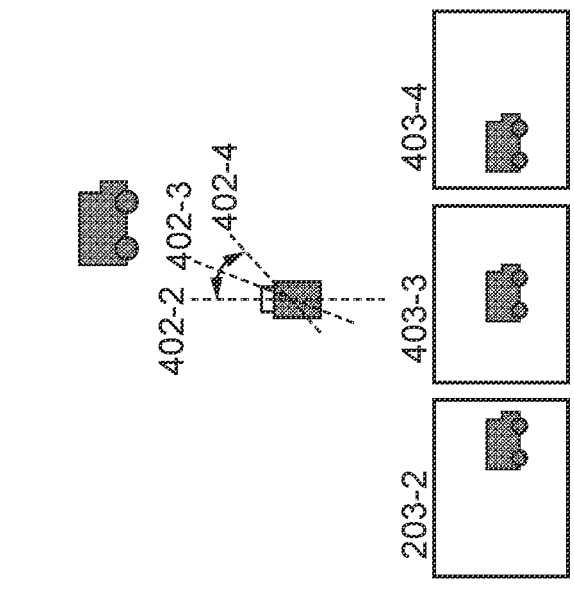
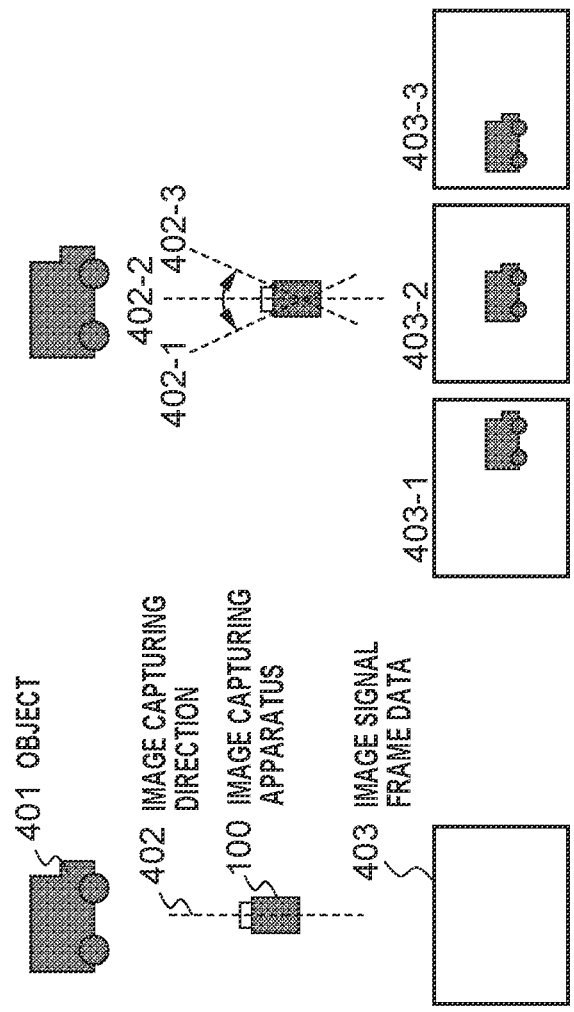

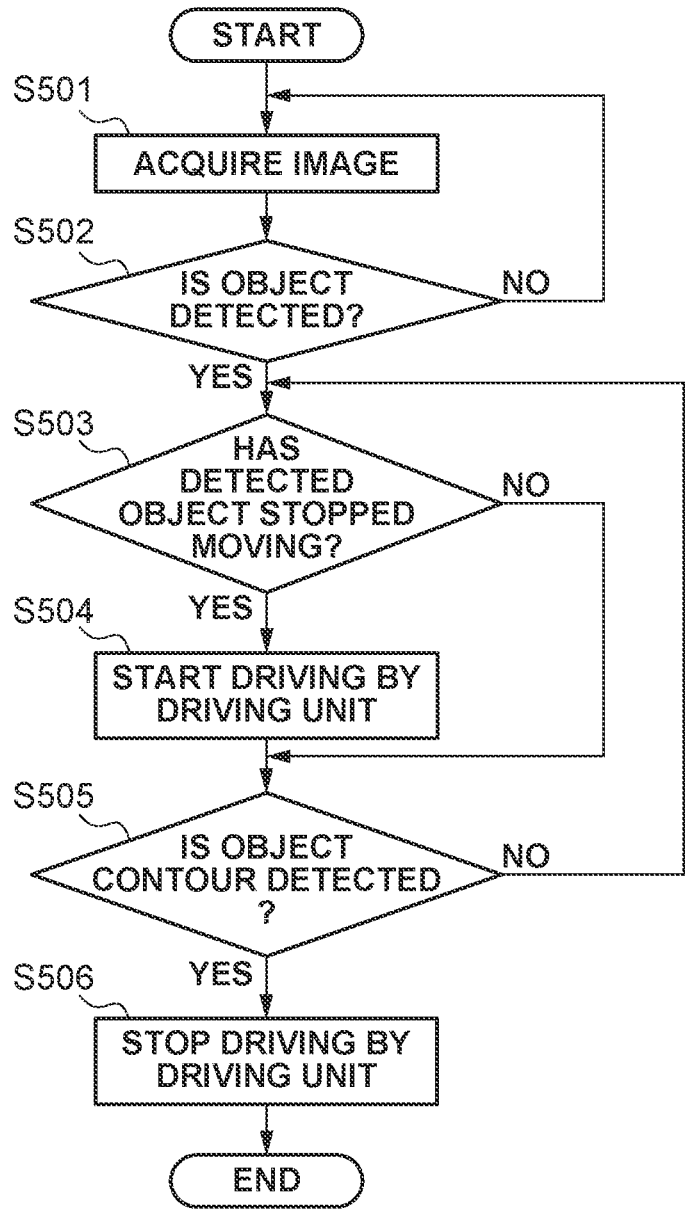

INFORMATION PROCESSING APPARATUS, INFORMATION PROCESSING METHOD, AND STORAGE MEDIUM

CROSS-REFERENCE TO RELATED APPLICATION

This application is a Continuation of U.S. application Ser. No. 17/835,826, filed Jun. 8, 2022, which claims priority from Japanese Patent Application No. 2021-097309, filed Jun. 10, 2021, which is hereby incorporated by reference herein in its entirety.

BACKGROUND

Technical Field

The aspect of the embodiments relates to a technique for detecting an object using an event-based sensor.

Description of the Related Art

As discussed in Japanese Patent Application Laid-Open No. 2020-72317, an event-based sensor that outputs in real time a change in luminance of each pixel as an address event signal is known.

SUMMARY

An apparatus includes a motion detection unit configured to detect a moving object in an angle of view based on an event signal indicating a location of a pixel where a luminance change occurs and time when the luminance change occurs, a shape detection unit configured to detect a shape of the moving object from frame data generated based on the event signal, and a control unit configured to change the angle of view, wherein in a case where the detected moving object is not currently detected, the shape detection unit detects the shape of the moving object by changing the angle of view by a predetermined value.

Further features of the present invention will become apparent from the following description of exemplary embodiments with reference to the attached drawings.

BRIEF DESCRIPTION OF THE DRAWINGS

FIG. 3 is a block diagram illustrating a functional configuration example of the information processing apparatus.

FIGS. 4A, 4B, and 4C are schematic diagrams each illustrating an object detection method.

FIG. 5 is a flowchart illustrating processing to be executed by the information processing apparatus.

DESCRIPTION OF THE EMBODIMENTS

Exemplary embodiments of the present invention will be described in detail below with reference to the accompanying drawings. Configurations described in the following exemplary embodiments are merely examples. The present invention is not limited to the illustrated configurations.

A first exemplary embodiment will be described. A synchronous-type photoelectric conversion element that captures image data (frame) in synchronization with a synchronous signal, such as a vertical synchronous signal, has heretofore been conventionally used in an image capturing apparatus or the like. This typical synchronous-type photoelectric conversion element can only acquire image data only in each cycle of the synchronous signal (e.g., 1/60 seconds), so that it is not applicable in a case where high-speed processing is required. Accordingly, for example, Japanese Patent Application Laid-Open No. 2020-72317 discusses an asynchronous-type photoelectric conversion element that detects in real time a luminance change as an address event for each pixel address. The photoelectric conversion element that detects an event for each pixel address as described above is referred to as a dynamic vision sensor (DVS), which is hereinafter referred to as an event-based sensor. An image capturing apparatus using such an event-based sensor is good at detecting a motion of an object. Accordingly, the image capturing apparatus can be used for, for example, road monitoring to monitor various moving objects such as vehicles and people.

Figure 1:
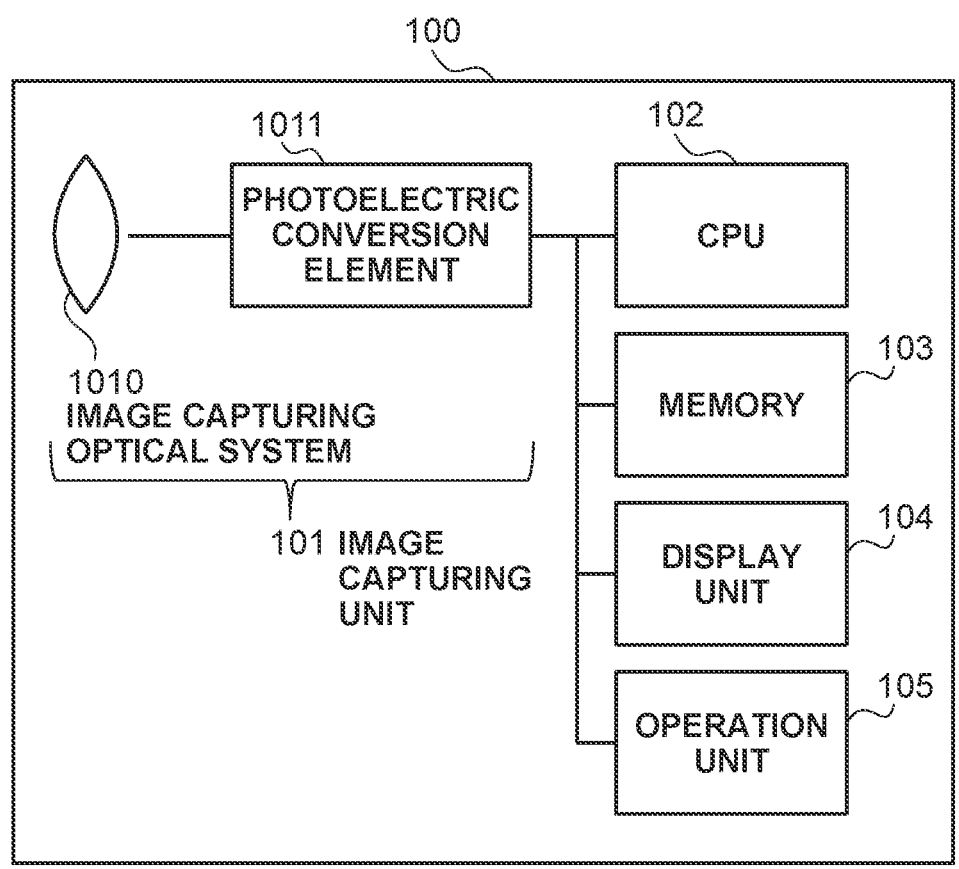
FIG. 1 is a block diagram illustrating a hardware configuration example of an information processing apparatus.

Hardware Configuration of Image Capturing Apparatus 100: FIG. 1

FIG. 1 is a block diagram illustrating a hardware configuration example of an image capturing apparatus (information processing apparatus) 100.

Specifically, the image capturing apparatus 100 is an image capturing apparatus including an event-based sensor. A function of performing image processing and a function of executing analysis processing (motion detection) on an image may be provided in respective different apparatuses. The image capturing apparatus 100 includes an image capturing unit 101, a central processing unit (CPU) 102, a memory 103, a display unit 104, and an operation unit 105. The image capturing unit 101 includes an image capturing optical system 1010 and a photoelectric conversion element 1011. The photoelectric conversion element 1011 is an event-based sensor that outputs an address event signal corresponding to received incident light. The event-based sensor detects a change in luminance of each pixel as an event. An address event signal indicates a location of a pixel where a luminance change occurs and time when the luminance change occurs. Specifically, the image capturing optical system 1010 is a light-receiving lens that receives incident light and forms an image on the photoelectric conversion element 1011. The CPU 102 reads out an operating system (OS) and other programs stored in the memory 103 and executes the OS and other programs. The CPU 102 controls the components connected to the CPU 102 to perform calculations, logical determination, and the like in various processing. Examples of processing to be executed by the CPU 102 include information processing according to the first exemplary embodiment.

Further, the CPU 102 controls focus driving and aperture driving for the image capturing optical system 1010, and driving of the photoelectric conversion element 1011. Examples of the memory 103 include a hard disk drive and an external storage device. The memory 103 stores programs and various data for information processing according to the present exemplary embodiment. The display unit 104 is, for example, a display apparatus that displays calculation results of the information processing apparatus 100 in response to an instruction from the CPU 102. Any type of display apparatus, such as a liquid crystal display apparatus, a projector, or a light-emitting diode (LED) indicator, can be used. Examples of the operation unit 105 include a touch panel, a keyboard, a mouse, and a robot controller. The operation unit 105 is a user interface that receives an instruction input by a user. The information processing apparatus 100 may include a mechanism other than the above-described hardware configuration.

Figure 2A:
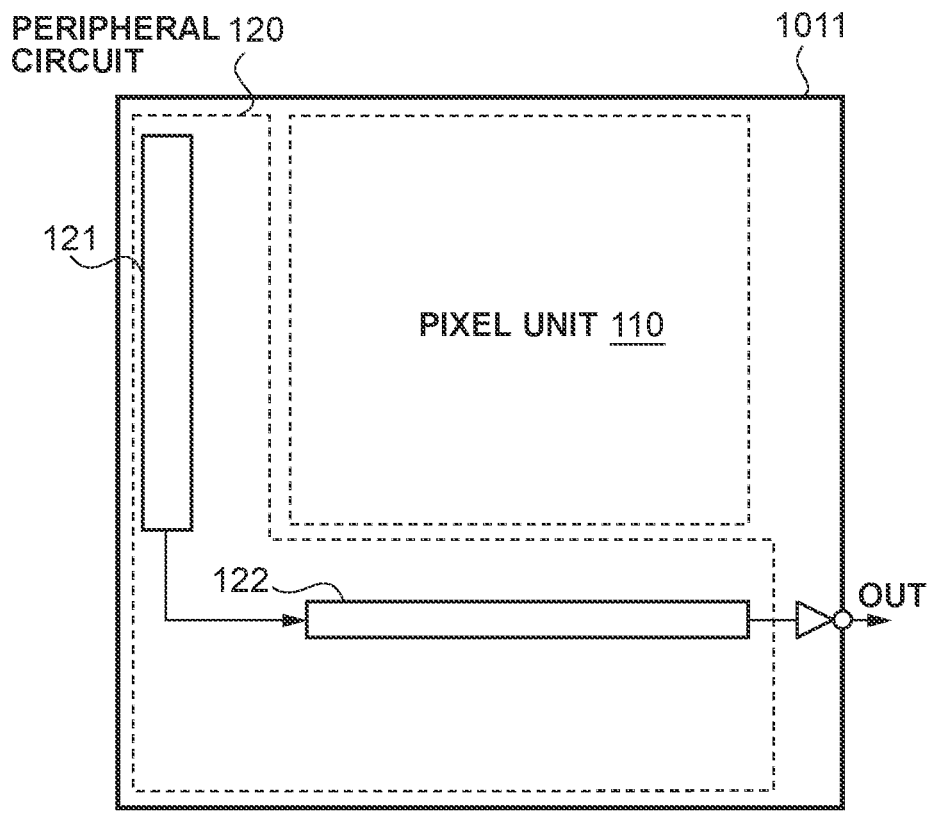
FIG. 2A illustrates a configuration example of a photoelectric conversion element.
Figure 2B:
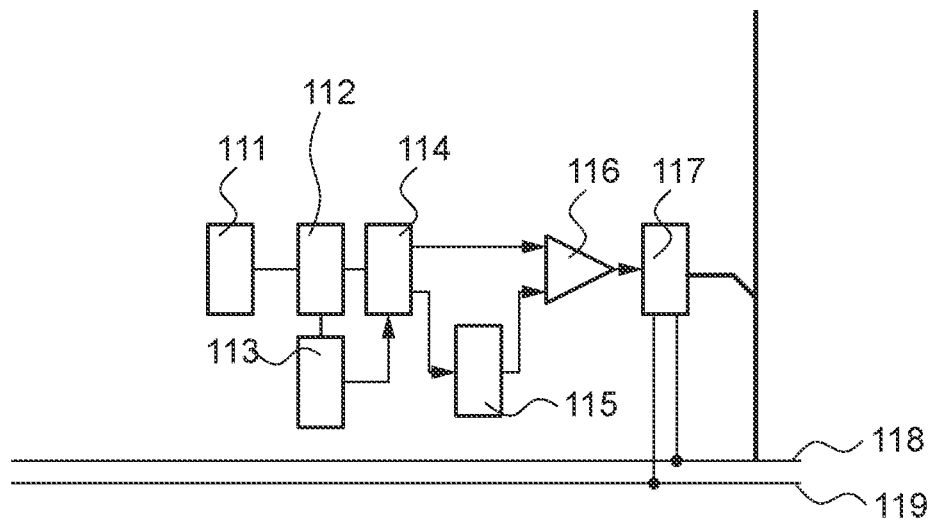
FIG. 2B illustrates a configuration example of a pixel unit.

Photoelectric Conversion Element 1011: FIGS. 2A and 2B

An example of the photoelectric conversion element (event-based sensor) 1011 according to the present exemplary embodiment will be described. The event-based sensor counts the number of incident photons and determines a timing when the number of counted photons exceeds a predetermined threshold. In addition, the event-based sensor measures a required time (number of clocks) for the number of photons to become a first threshold or more for each pixel, and compares the required times to detect a luminance change. Specifically, assuming that the previously-measured required time is represented by T0 and the last-measured required time is represented by T, if a difference T−T0 is more than or equal to a second threshold, a luminance change in a minus direction is detected. If a difference T0−T is more than or equal to the second threshold, a luminance change in a plus direction is detected. If the difference between T and T0 is less than the second threshold, no luminance change is detected. The second threshold is a value greater than or equal to "0". A preset value or a value that is set depending on another parameter is used as the second threshold.

A detailed configuration of the event-based sensor will be described below. FIG. 2A illustrates a configuration example of the photoelectric conversion element 1011. The photoelectric conversion element 1011 includes a pixel unit 110 and a peripheral circuit 120. The peripheral circuit 120 includes a vertical arbitration circuit 121 and a horizontal read-out circuit 122.

FIG. 2B illustrates a configuration example of each pixel unit included in the event-based sensor. The pixel unit 110 includes a photoelectric conversion unit 111, a pixel counter 112, a time counter 113, a first determination circuit 114, a memory 115, a comparator 116, a second determination circuit 117, a response circuit 118, and a selection circuit 119. The photoelectric conversion unit 111 includes an avalanche photodiode (single-photon avalanche photodiode (SPAD)) that operates in a Geiger mode, and the pixel counter 112 is configured to count the number of photons incident on the photoelectric conversion unit 111. The time counter 113 counts the time during which photons are incident on the photoelectric conversion unit 111. The configuration of the event-based sensor using the SPAD makes it possible to detect a luminance change at a single-photon level. By detecting a luminance change at the single-photon level, the address event signal can be obtained even in a dark state, for example, during night time.

When the number of photons counted by the pixel counter 112 reaches the first threshold, the first determination circuit 114 stops the time counter 113 counting the time. The memory 115 stores the previous count values obtained by the time counter 113 in the past. The count value corresponding to the difference between the current count value of the time counter 113 and the previous count value of the time counter 113 is obtained by using the comparator 116.

In a case where the difference count value is more than or equal to the second threshold, the second determination circuit 117 transmits a request signal to the vertical arbitration circuit 121 via the response circuit 118. The response circuit 118 receives a response indicating that an output of address event data is "enabled" or "disabled" from the vertical arbitration circuit 121. In a case where the difference count value is less than the second threshold, the request signal is not transmitted.

When the response circuit 118 receives a response indicating that the output is enabled, the selection circuit 119 outputs the count value from the time counter 113 to the horizontal read-out circuit 122. The horizontal read-out circuit 122 outputs the received count value as an output signal from the photoelectric conversion element 1011 to an image acquisition unit 201.

The difference count value calculated by the comparator 116 corresponds to the reciprocal of the frequency of incident photons. Accordingly, the photoelectric conversion element 1011 according to the present exemplary embodiment includes a function of measuring a "change in the frequency of incident photons", that is, a luminance change. The second determination circuit 117 is used to output an address event only when the difference between time intervals when the number of incident photons reaches the first threshold is more than or equal to the second threshold. Specifically, the photoelectric conversion element 1011 is configured such that, if the difference between the frequencies of incident photons is more than or equal to the second threshold, the frequency of incident photons is output, and if the difference is less than the threshold, the frequency of incident photons is not output. With the above-described configuration, the asynchronous-type photoelectric conversion element that detects in real time a luminance change as an address event for each pixel address can be achieved.

Variations of Photoelectric Conversion Element

The exemplary embodiment described above illustrates an example of using the photoelectric conversion element 1011 that detects a change in the frequency of incident photons by measuring the time during which photons are incident using the SPAD provided in the photoelectric conversion unit 111. However, any photoelectric conversion element other than the photoelectric conversion element 1011 illustrated in FIGS. 2A and 2B can be used as long as the photoelectric conversion element is an asynchronous-type photoelectric conversion element that detects in real time a luminance change as an address event. For example, a photoelectric conversion element that detects a luminance change as a voltage change as discussed in Japanese Patent Application Laid-Open No. 2020-72317 may be used.

Functional Configuration Example of Image Capturing Apparatus 100: FIG. 3

FIG. 3 is a block diagram illustrating a functional configuration example of the image capturing apparatus 100. The image capturing apparatus (information processing apparatus) 100 includes the image capturing unit 101, the image acquisition unit 201, a control unit 202, a motion detection unit 203, a contour detection unit 204, a communication unit 205, a driving unit 206, a network 207, and an external apparatus 208.

The image capturing unit 101 includes the image capturing optical system 1010 and the photoelectric conversion element 1011. Light that is transmitted through the image capturing optical system 1010 is focused on the photoelectric conversion element 1011 and is converted into an electrical signal, and then the electrical signal is output as an image signal by the image acquisition unit 201. In particular, the image capturing unit 101 indicates a lens casing.

The image capturing optical system 1010 includes a plurality of lenses and a holding member, and includes a mechanical structure for controlling the aperture, zoom, and focus. The image capturing optical system 1010 may be configured to be controlled by an image capturing optical system control unit (not illustrated). The photoelectric conversion element 1011 detects a change in the luminance value of an object for each pixel, and outputs an address event signal for pixels where the change is detected. Specifically, the address event signal is output from a sensor that detects a luminance change per unit time for each pixel. If no luminance change is detected, the address event signal is not output, or information indicating that no luminance change is detected is provided.

The image acquisition unit 201 acquires frame data indicating a pixel where a luminance change occurs in a predetermined period, based on the address event signal. Specifically, an image signal converted into frame data is output by performing correction processing or development processing on an electrical signal converted by the photoelectric conversion element 1011. The motion detection unit 203 detects that the object has transitioned from a moving state to a stopped state based on the image signal. If the object is moving, a change in the luminance value occurs in a certain region in a concentrated manner. Accordingly, a threshold is set for the area of the region where a change in the luminance value occurs. If the area of the region is more than or equal to the threshold, it is determined that the object is moving, and then if the area of the region becomes less than the threshold, it is determined that the object has stopped moving.

Upon detecting that the object has stopped moving, the control unit 202 transmits a control signal to the driving unit 206, and causes the driving unit 206 to drive the image capturing apparatus 100 to move in a predetermined cycle in response to the control signal.

The driving unit 206 includes at least a single-axis drive mechanism configured to change an image capturing direction of the image capturing apparatus 100. A target to be driven by the driving unit 206 is not limited only to the image capturing apparatus 100. For example, the image capturing unit 101 may be driven, if the image capturing direction can be changed. The contour detection unit 204 extracts an object contour from the image signal by performing existing edge analysis processing for detecting a change in the luminance value from the image signal acquired by the image acquisition unit 201, and recognizes the object by performing image recognition processing such as machine learning. An image to be used for analysis is an integrated image or added image that is converted into frame data by the image acquisition unit 201. The image capturing apparatus 100 may further include a recognition unit that recognizes an object class based on a detected shape.

The communication unit 205 transmits the image signal output from the image acquisition unit 201 to the external apparatus 208 via the network 207. The communication unit 205 can receive various parameters for the image capturing apparatus 100 from the external apparatus 208, and can output various parameters to the control unit 202. Examples of various parameters include a control signal for the driving unit 206 and a signal indicating that the shape detection is complete.

The network 207 includes a router that complies with communication standards such as Ethernet® and a cable, and enables communication between the image capturing apparatus 100 and the external apparatus 208.

The external apparatus 208 refers to an apparatus including a display unit, such as a personal computer (PC) or a mobile terminal, and can communicate with the image capturing apparatus 100 via the network 207. The external apparatus 208 can display images output from the image acquisition unit 201. The external apparatus 208 includes a user interface, which enables the external apparatus 208 to transmit a command to the image capturing apparatus 100 according to a user operation to control the image capturing apparatus 100. In particular, operating the user interface on a display screen makes it possible to control the driving unit 206 to start or stop driving for the object of which the contour cannot be detected. The external apparatus 208 may include a user interface that enables adjustment of the amplitude or the driving speed of the driving unit 206.

Motion Detection Unit 203

A method in which the motion detection unit 203 detects whether an object is moving will be described in detail. The motion detection unit 203 detects the number of connected pixels where a luminance change occurs based on frame data, thereby detecting a moving object in the frame data.

First, it is determined whether the number of connected pixels is more than or equal to a first threshold N1 for motion information based on the location of each pixel included in the frame data acquired by the image acquisition unit 201. If a set of pixels (the number of connected pixels) where a luminance change detected based on the address event signal occurs is more than or equal to the first threshold N1 for the motion information, it is determined that the luminance change is not caused by noise, i.e., a moving object is included in the frame data, and then the processing proceeds to comparison processing based on feature point data. The term "the number of connected pixels" used herein refers to the number of connected (adjacent) pixels including a pixel output at the same time stamp (or in any period) on a two-dimensional plane.

Specific Examples: FIGS. 4A, 4B, and 4C

FIGS. 4A, 4B, and 4C are schematic diagrams each illustrating an example of an object detection method according to the first exemplary embodiment. Referring first to FIG. 4A, an output when an object 401 stops moving will be described. The image capturing direction in which the image capturing apparatus 100 captures an image of the object 401 is indicated by a broken line 402. Frame data 403 indicates frame data on an image signal acquired by the image acquisition unit 201 when no object is detected by the motion detection unit 203. Since the photoelectric conversion element 1011 outputs a signal only when a change in the luminance value of the object is detected, if the object stops moving, no object is detected like in the frame data 403. Accordingly, as illustrated in FIG. 4B, the driving unit 206 repeatedly drives the image capturing apparatus 100 between image capturing directions 402-1 and 402-3. In other words, as illustrated in frame data 403-1, 403-2, and 403-3, an image capturing range is changed to forcibly cause a luminance change so that the object that has stopped moving is included in the image capturing range. This control processing makes it possible to detect the object that has stopped moving.

If the driving amplitude with respect to the object is extremely small, the change in the luminance value is small, and if the driving amplitude is extremely large, the time period of a monotonous luminance change in one direction increases, which makes it difficult to detect the shape of the object. Accordingly, in one embodiment, the driving amplitude of the driving unit 206 is set to be almost equal to the size of the object. Assuming herein that the size of the object is defined as the length of the object with respect to the axial direction of the driving unit 206, the size of the object is obtained based on the number of pixels in the axial direction of the region where a change in the luminance value occurs after driving the driving unit 206 before or after the object stops moving. The size of the object may be defined as the area of the object.

In one embodiment, the driving amplitude is controlled within the difference between the size of the object and the number of pixels preliminarily stored, or within a ratio with respect to the object size. To facilitate arithmetic processing in the contour detection unit 204, the driving unit 206 is driven in a constant cycle.

Variations of the method of driving the driving unit 206 will be described below.

When the object is large, the amplitude of the driving unit 206 may be increased relative to when the object is small. The driving unit 206 may be driven such that the amplitude can be gradually increased from a driving start point. With this configuration, even when the object is large, a sufficiently large luminance change can be caused by increasing the amplitude, which facilitates the shape detection.

The image capturing apparatus 100 may include an electronic zoom mechanism or an optical zoom mechanism. When the zoom magnification is high, the amplitude or the driving speed may be decreased relative to when the zoom magnification is low. When the zoom magnification is high, the above-described processing is performed to control the object not to move out of the image capturing range, i.e., frame out.

As illustrated in FIG. 4C, the driving unit 206 may control the driving operation to be repeatedly performed between the directions 402-2 and 402-4 with the driving axis 402-3 as a center therebetween so that the object 401 is located at the center of an angle of view. Driving the driving unit 206 based on the location of the object makes it possible to cause a sufficiently large luminance change, while reducing the possibility that the object moves out of the image capturing range, i.e., frames out. Additionally, periodic driving of the driving unit 206 based on the location of the object facilitates arithmetic processing for shape detection.

The driving unit 206 may include a two-axis drive mechanism. Although it is difficult for a single-axis drive mechanism to detect object edges in the vertical direction with respect to the axis of the drive mechanism, the use of the two-axis drive mechanism facilitates detection of all edges of the object by moving the driving unit 206 in a plurality of directions. Accordingly, in one embodiment, the driving unit 206 is moved in the horizontal and vertical directions. For example, if the driving unit 206 is driven in the horizontal direction for a long period of time, the detection frequency of edges to be detected by driving the driving unit 206 in the vertical direction decreases. Accordingly, in another embodiment, the driving unit 206 is moved in the horizontal and vertical directions alternately. The driving direction is not limited to the horizontal and vertical directions, but instead may be oblique directions, or the driving unit 206 may be rotated.

Flowcharts

FIG. 5 is an example of a flowchart for implementing the first exemplary embodiment. Processing illustrated in the flowchart of FIG. 5 is executed by the CPU 102, which is illustrated in FIG. 1 and serves as a computer, according to a computer program stored in the memory 103.

In step S501, the image acquisition unit 201 acquires frame data (image) based on an address event signal. In step S502, the motion detection unit 203 detects an object based on the frame data. In object detection processing, the above-described motion detection processing method is used to detect an object. It is determined that an object is detected if the number of connected pixels where a luminance change occurs is more than or equal to a predetermined threshold. If an object is detected (YES in step S502), the processing proceeds to step S503. If no object is detected (NO in step S502), the processing returns to step S501. In step S503, the motion detection unit 503 determines whether the detected object has stopped moving. If it is determined that the number of connected pixels where a luminance change occurs is less than the predetermined threshold based on frame data generated after the frame data in which the moving object is detected, it is determined that the object has stopped moving (YES in step S503), and then the processing proceeds to step S504. If the number of connected pixels where a luminance change occurs is more than or equal to the predetermined threshold, it is determined that the object is moving, i.e., the object has not stopped moving (NO in step S503), and then the processing proceeds to step S505. In step S504, the driving unit 206 starts the driving operation. In other words, the control unit 202 controls the driving unit 206 to perform a predetermined motion. In step S505, it is determined whether an object contour is detected by the contour detection unit 204 based on frame data. If the object contour is detected (YES in step S505), the processing proceeds to step S506. If the object contour is not detected (NO in step S505), the processing returns to step S503 to detect an object again. In step S506, the control unit 202 controls the driving unit 206 to stop driving, and then the processing in this flowchart ends.

The above-described processing enables the image capturing apparatus 100 using the event-based sensor to detect the contour of the object that has stopped moving.

In a second exemplary embodiment, a description will be given of a method for driving the driving unit 206 in a case where the shape detection is started when the object is moving and the object contour is not detected when the object stops moving.

Figure 6:
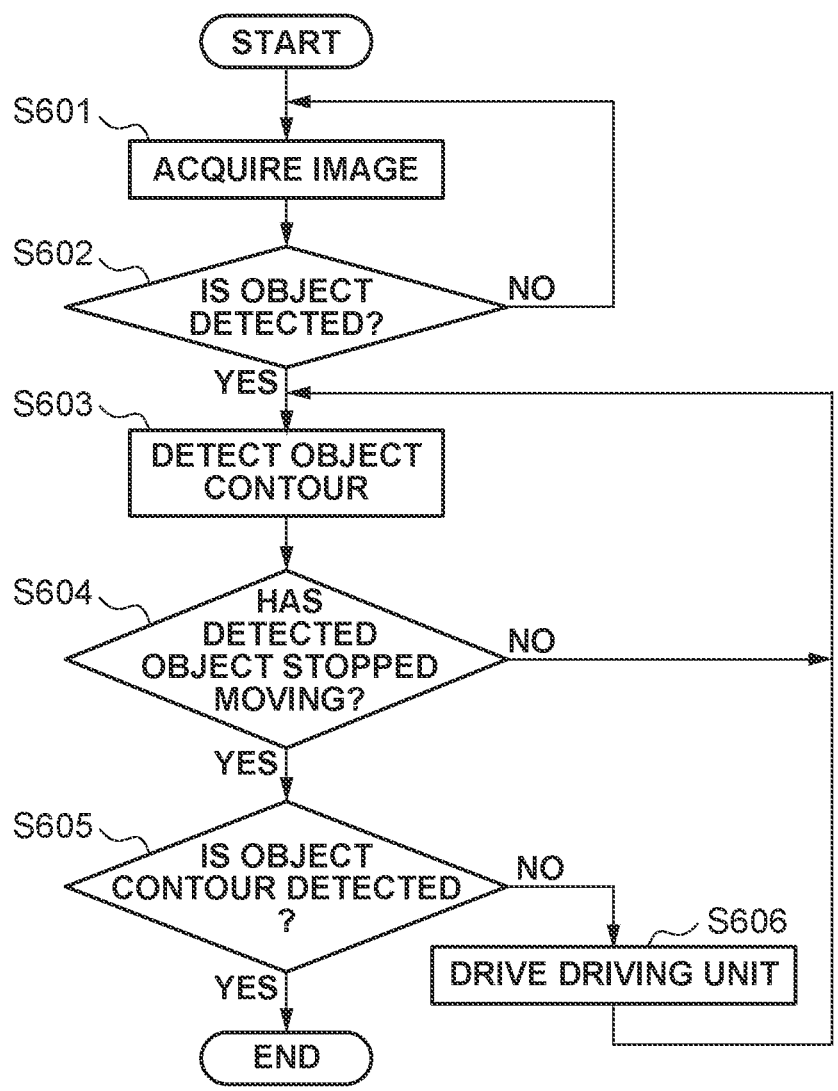
FIG. 6 is a flowchart illustrating processing to be executed by the information processing apparatus.

FIG. 6 is a flowchart for controlling the driving unit 206 to be driven when the object of which the contour cannot be detected during an operation stops moving. In step S601, the image acquisition unit 201 acquires frame data (image) based on an address event signal. In step S602, the motion detection unit 203 detects an object based on the frame data. In step S603, the contour detection unit 204 detects an object contour based on the frame data. In step S604, the motion detection unit 203 determines whether the detected object has stopped moving. If the motion detection unit 203 determines that the object has stopped moving (YES in step S604), the processing proceeds to step S605. If the motion detection unit 203 determines that the object has not stopped moving (NO in step S604), the processing returns to step S603, and the processing of step S603 is repeatedly performed until the motion detection unit 203 detects that the object has stopped moving. In step S605, it is determined whether an object contour is detected by the contour detection unit 204 before the object stops moving. If the object contour is detected (YES in step S605), the processing in this flowchart ends. If the object contour is not detected (NO in step S605), the processing proceeds to step S606. If the number of connected pixels where a luminance change occurs is more than or equal to the predetermined threshold, it is highly likely that the object contour can be detected. Therefore, in this case, it is determined that the object contour is detected. Alternatively, the contour detection unit 204 may determine whether an object contour is detected based on, for example, a likelihood obtained during contour detection processing. In step S606, the control unit 202 drives the driving unit 206. After driving the driving unit 206, the processing returns to step S603 to determine whether an object contour is detected. If the object contour is detected in step S605 (YES in step S605), the control unit 202 causes the driving unit 206 to stop driving, and then the processing in this flowchart ends.

The condition for driving the driving unit 206 is set such that the driving unit 206 is driven not only when the object stops moving, but also when the object contour is not detected before the object stops moving, thereby making it possible to reduce the driving frequency.

In a third exemplary embodiment, a description will be given of an example where the user can determine whether an object contour is detected and can input an instruction to drive the driving unit 206.

The image capturing apparatus 100 includes a reception unit that receives an input, such as a control instruction, from the user. The user inputs a determination result indicating whether an object contour is detected by visually observing the display of frame data. Further, the user can input an instruction to drive the driving unit 206. The user can use the user interface included in the image capturing apparatus 100 or the external apparatus 208 to perform various input operations. For example, the user can control the driving unit 206 to start or stop the driving operation for the object. If the user cannot detect the contour of the object by visual observation, instead of mechanically detecting the contour of the object, the user inputs an instruction to drive the driving unit 206 via the user interface, which allows the user to visually check the object contour. Alternatively, the user may designate a motion of the driving unit 206.

As a display method, for example, for a period of time when the driving unit 206 is driven, an image of a target object may be clipped out and displayed at the center of the display screen. If the object contour can be detected, a display frame and a category pop-up window may be displayed.

Although the processing flow is basically similar to the processing flow illustrated in FIG. 5, variations of the processing can be considered when the external apparatus 208 is added. For example, if the user wishes to visually check the contour of the object that has stopped moving, the user can start driving of the driving unit 206. The user can also determine a timing to stop driving of the driving unit 206.

As described above, the image capturing apparatus 100 using the event-based sensor enables the user to detect the contour of the object that has stopped moving at a desired timing.

A case where the contours of a plurality of objects are to be detected will be described below. Also, in the case of detecting the contours of a plurality of objects, the object contours can be detected by driving the driving unit 206 when the objects stop moving. In a variation of this configuration, the object contours are detected by the contour detection unit 204 when the motion detection unit 203 detects that the objects are moving, and driving of the driving unit 206 is started when the objects of which the contours cannot be detected have stopped moving. Alternatively, the user may select the objects of which the contours are to be detected, and may drive the driving unit 206. Yet alternatively, the driving unit 206 may be driven with an amplitude that is almost equal to the size of the object that has stopped moving. After the contour of the object is detected, another object that has stopped moving may be detected by moving the driving unit 206 with a larger amplitude.

According to the above-described configuration, even in a case where a plurality of objects is to be detected, the image capturing apparatus 100 using the event-based sensor can detect the contour of each object that has stopped moving.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An apparatus comprising:
   at least one processor; and
   a memory coupled to the at least one processor, the memory storing instructions that, when executed by the at least one processor, cause the at least one processor to:
   detect a moving object in an angle of view based on an event signal indicating a location of a pixel where a luminance change occurs and time when the luminance change occurs;
   detect a shape of the moving object from frame data generated based on the event signal; and
   change the angle of view,
   wherein in a case where the moving object is not currently detected, the shape of the moving object is detected by changing the angle of view by a predetermined value, and
   wherein the predetermined value is determined based on a size of the moving object.

2. The apparatus according to claim 1,
   wherein the event signal is output by a sensor configured to detect a change in luminance of each pixel, and
   wherein in a case where no luminance change is detected, the event signal is not output, or information indicating that no luminance change is detected is provided.

3. The apparatus according to claim 2, wherein the instructions further cause the at least one processor to detect the moving object in the frame data by detecting a number of connected pixels where the luminance change occurs based on the frame data.

4. The apparatus according to claim 3, wherein in a case where the number of connected pixels in the frame data is more than or equal to a threshold, the moving object is detected, and in a case where a number of connected pixels in frame data generated after the moving object is detected is less than the threshold, it is detected that the moving object has stopped moving.

5. The apparatus according to claim 1, wherein the shape of the moving object is detected from the frame data by performing edge analysis processing.

6. The apparatus according to claim 1, wherein the instructions further cause the at least one processor to recognize a class of the moving object based on the detected shape.

7. The apparatus according to claim 1, further comprising:
a driving mechanism that is controlled to change the angle of view by the predetermined value, and
wherein the driving mechanism is controlled to be driven with an amplitude in a constant cycle in accordance with the predetermined value.

8. The apparatus according to claim 7, wherein the amplitude is determined based on the size of the moving object.

9. The apparatus according to claim 7, wherein the amplitude of the driving mechanism is determined to be decreased when a zoom magnification of a mechanism that performs one of electronic zooming and optical zooming is high relative to when the zoom magnification is low.

10. The apparatus according to claim 7, wherein a central axis of the driving mechanism is determined such that the moving object is located at a center of the angle of view.

11. The apparatus according to claim 7, wherein the driving mechanism is controlled such that a moving direction of the driving mechanism varies with time.

12. The apparatus according to claim 1, wherein in a case where the shape of the moving object is detected, changing the angle of view is stopped.

13. The apparatus according to claim 1, the instructions further cause the at least one processor to output the detected shape to a display apparatus.

14. The apparatus according to claim 13, wherein the detected shape is output to be displayed such that the detected shape is superimposed on the frame data.

15. The apparatus according to claim 1, wherein changing of the angle of view is controlled based on a motion set by a user.

16. The apparatus according to claim 1, wherein the moving object is detected based on a location of a pixel including a specific signal included in the event signal.

17. The apparatus according to claim 1, wherein the event signal is output from a conversion element including a pixel configured to output a signal based on incidence of a photon.

18. A storage medium storing a program for causing a computer to execute a method, the method comprising:
detecting a moving object in an angle of view based on an event signal indicating a location of a pixel where a luminance change occurs and time when the luminance change occurs;
detecting a shape of the moving object from frame data generated based on the event signal; and
changing the angle of view,
wherein in a case where the moving object is not currently detected, the shape of the moving object is detected by changing the angle of view by a predetermined value, and
wherein the predetermined value is determined based on a size of the moving object.

19. A method comprising:
detecting a moving object in an angle of view based on an event signal indicating a location of a pixel where a luminance change occurs and time when the luminance change occurs;
detecting a shape of the moving object from frame data generated based on the event signal; and
changing the angle of view,
wherein in a case where the detected moving object is not currently detected, the shape of the moving object is detected by changing the angle of view by a predetermined value, and
wherein the predetermined value is determined based on a size of the moving object.

20. The apparatus according to claim 1, wherein the size of the moving object is obtained based on the frame data generated before the moving object becomes undetected.

* * * * *